March 8, 1949. G. W. SHADWICK 2,463,915
PROCESS OF MAKING BUTTER

Filed April 24, 1944 3 Sheets-Sheet 1

Inventor:
George W. Shadwick,
By Cushman Darby & Cushman
Attorneys.

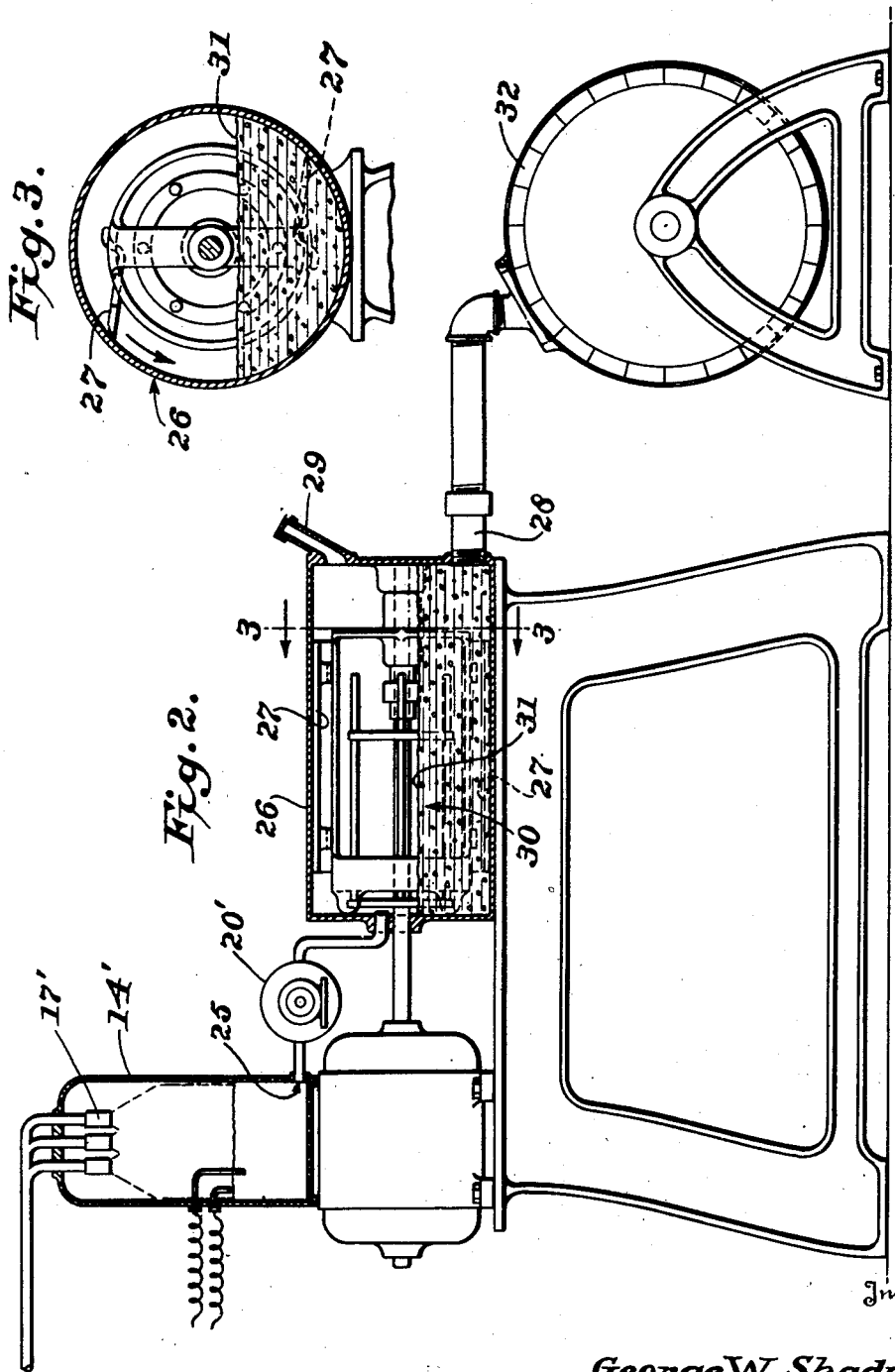

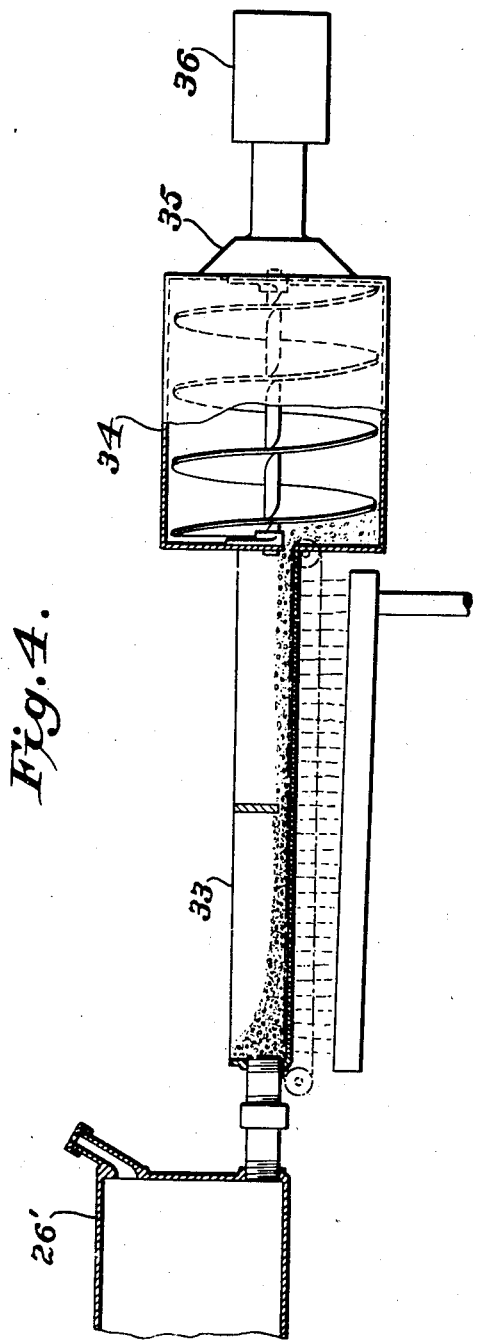

Patented Mar. 8, 1949

2,463,915

UNITED STATES PATENT OFFICE 2,463,915

PROCESS OF MAKING BUTTER

George W. Shadwick, Chicago, Ill., assignor to Beatrice Creamery Company, Chicago, Ill., a corporation of Delaware Application April 24, 1944, Serial No. 532,451

15 Claims. (Cl. 31—89)

The present invention relates to a process of making butter wherein the butterfat is recovered in the form of fat granules which may be suitably treated to produce solid butter.

The primary object of the invention is to provide a process wherein butter of high quality is produced with substantial savings in time, as compared with the present conventional methods involving churning.

I have discovered that when cream at a low temperature is formed as an expanded body by intimate contact with an inert gas under pressure, and thereafter this expanded body is subjected to a reduced pressure, i. e., released from its initial pressure state with liberation of the gas and with concomitant further expansion of the initially expanded mass, agitation of such expanded mass substantially instantly reverses its phase from the initial one of liquid milk fat in milk serum to that of a separation of buttermilk and coalesced fat. In this manner, granules of butterfat are formed with accompanying release of the gas and these butterfat granules are in a highly coalescable state whereby they may be quickly worked into solid butter without going through a conventional churning procedure.

Another object of the invention is to provide a continuous process wherein the cream is first pasteurized, then continuously delivered from the pasteurizer to a cooler which, as distinguished from customary vat cooling, cools the cream to a low temperature, e. g., about 38 to 50° F., while it is travelling to the pressure chamber. In the pressure chamber the cream is subjected to the inert gas and continuously removed from the chamber to the reduced pressure equipment and then to the working instrumentality. In this manner cream is pumped in, and continuously treated to produce butter granules which are then worked into a homogeneous butter mass.

A further object of the invention is to subject the expanded lacteal fluid to a preliminary reduced pressure and agitation treatment whereby a reversal of phase takes place and results in a condition in which the fat and buttermilk are separated from substantially all of the gas before the buttermilk containing the fat granules or the fat granules which have been collected from the buttermilk are subjected to the working treatment. In this manner, the full capacity of the working instrumentality is availed of, whereas if the expanded fluid were introduced thereto, the capacity and, hence, the speed of working would be reduced because of the expanded character of the mass.

Of equal importance with the foregoing, it is an object of the invention to reduce the time required to make butter ready for printing and packaging by at least eliminating the time now employed for churning, namely, 35 to 50 minutes.

In carrying out the invention, the cream either sweet or sour and having varying degrees of acidity and preferably a fat content of about 32 to 40% is pasteurized by any of the conventional procedures and subsequently cooled in any suitable manner. Cream of any useful fat content may be, of course, employed. Preferably the pasteurized cream at a temperature of about 38 to 50° F. is then introduced into an apparatus for forming the butter granules.

I prefer to pasteurize and then cool the cream as continuous successive operations, i. e., the cream is cooled while travelling from the pasteurizer to the said apparatus for forming granules, as distinguished from the usual vat cooling.

The cream is continuously pumped or otherwise conveyed from the cooler to a pressure chamber where as finely divided particles, a liquid mass, or both, it is subjected to an inert gas under a pressure, e. g., a pressure greater than the pressure at which the cream is introduced to the chamber. This latter pressure may vary with the equipment but generally a pressure of about 30 to 70 pounds is satisfactory with available equipment but lower pressures, of course, may be used, e. g., 5 pounds. The pressures mentioned herein are in pounds per square inch. That is to say, the gas pressure is such as to (1) cause the gas to pass through and intimately contact a liquid body; (2) intimately contact with particles of cream issuing from a suitable spray or rosette, and (3) pass through a liquid body and mix with the particles from a nozzle above the liquid level.

The fat content of the cream quickly absorbs the inert gas by reason of its low temperature in a manner which assures that in the subsequent procedure, a reversal of phase will take place and the fat will be broken down into coalescable granules, for example, suitable for working into butter, and of substantially the size of a pin head up to small pea size.

The treatment with an inert gas, whereby the gas is absorbed by the fat, forms an expanded body which is drawn from the pressure chamber and subjected to a reduced pressure with respect to the initial pressure which causes the expanded lacteal fluid to further expand. The reduced pressure chamber has an agitating means which rapidly, e. g., substantially instantaneously reverses the phase of the expanded fluid, thereby forming butter granules and simultaneously releasing the gas.

The gas may be collected and re-used, and the granules in highly coalescable state are (1) separated from the buttermilk as by straining or draining and may then be gathered and worked, or (2) the buttermilk containing the granules may be delivered to the gathering and working equipment.

If the granules have been separated from the buttermilk, they are washed to remove residual buttermilk and initiate gathering, then gathering is completed by suitable agitation which requires about 2 or 3 minutes, and then the gathered granules are worked dry into butter with inclusion of moisture and salt as required to produce the proper butter composition.

In some cases, even the gathering time may be eliminated or reduced as by (1) simultaneously washing and agitating or (2) agitating washed collected granules, while conveying them to a working instrumentality.

Where the buttermilk containing the granules is introduced into an agitating chamber, such as a conventional churn, the gathering of the granules takes place quickly, e. g., in two or three minutes, whereupon the buttermilk is drained, wash water is added and the mass worked to remove residual buttermilk. This in turn is then drained and the butter properly worked dry with suitable incorporation of salt and additional moisture to give the proper chemical composition for butter.

Each of the foregoing treatments results in substantial economy in operating time, in that the conventional churning time of 35 to 50 minutes is eliminated.

The butter by the procedures outlined may be packed in suitable tubs or boxes and refrigerated to allow the fat to set up, whereupon the butter may be printed and packaged or this may be heated as hereinafter described.

The steps above described may be carried out either separately or continuously. For purpose of illustration, we will describe continuous procedure which is preferred.

Referring to the drawings:

Figure 2 is a sectional view showing a preferred process and apparatus.

Figure 3 is a section on line 3—3 of Figure 2, and

Figure 1:
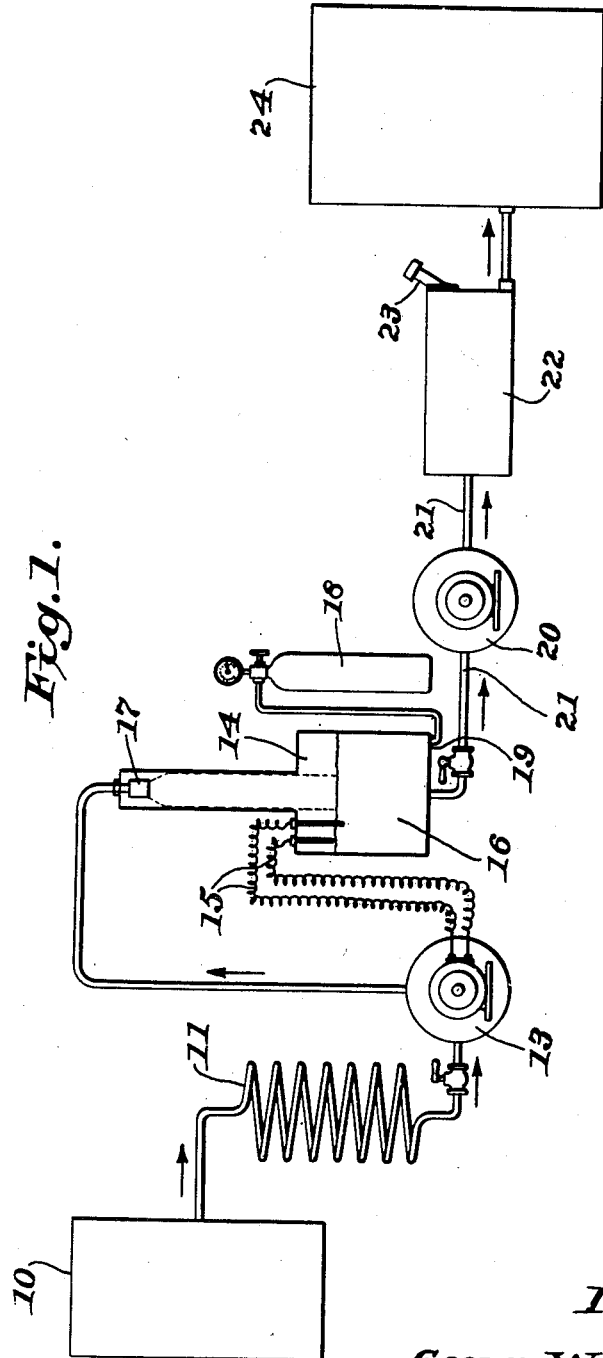
Figure 1 is a flow sheet.

Figure 4 is a flow sheet showing another form of the invention wherein the granules are gathered while being conveyed to the working instrumentality. During this travel the granules may be washed and agitated, or they may have been previously washed. After suitable working, the butter may be extruded from the worker or continuously introduced to an extrusion device or printer, whereby it is suitably printed and then continuously packaged.

Referring to the drawings, Figure 1 is a flow sheet illustrating a continuous operation for making butter in which the customary churning operation is eliminated.

The numeral 10 indicates a conventional pasteurizer from which the cream is delivered to a cooling means represented by the coil 11, being continuously carried from the pasteurizer and cooled in the coil 11 while travelling therethrough to a suitable pump 13 which delivers the cream at its reduced temperature, namely, about 38 to 50° F. to the pressure chamber 14. The cream may be at a somewhat lower or higher temperature, but the range recited is preferred.

The pump 13 is a positive type sanitary pump actuated intermittently by means of a control 15, such as an electronic device which automatically maintains a proper level of expanded cream 16 in the pressure chamber 14. Preferably, the cream is pumped into the pressure chamber 14 through a nozzle or plurality of nozzles 17 and in finely divided state falls by gravity upon the body of lacteal fluid 16.

The numeral 18 illustrates a carboy or other vessel containing gas under pressure, such as carbon dioxide, nitrogen or other inert gas. Carbon dioxide is preferred. This gas is conveyed by a pipe as shown to the pressure chamber 14 and released into the body of lacteal fluid therein, for instance, at the bottom of the chamber as shown at 19. However, the gas can be introduced at any suitable point which will assure intimate contact between the gas and the cream to form an expanded cream. The pressure of the gas is sufficiently greater than the liquid pressure to assure that it will intimately contact all parts of the liquid body 16 and bubble through the same to rise and contact the particles issuing from the nozzle arrangement 17, so that the fat in the sprayed cream particles and body 16 will thoroughly absorb the gas with the result that the liquid mass 16 has an expanded structure. Usually a gauge pressure of 30 to 370 pounds is satisfactory to assure thorough contact and mixing of the gas with the liquid body 16 and particles falling from the nozzle 17 so as to produce the desired absorption of the gas and the expanded structure.

The expanded lacteal fluid is continually drawn from the pressure chamber 14 by means of a positive pump 20 of variable capacity which acts as a positive metering valve to automatically maintain a uniform flow of the expanded cream from the bottom of the chamber 14 through the line 21 to a chamber 22 having a reduced pressure with respect to the pressure in the pressure chamber 14, whereby the lacteal fluid is further expanded. This reduced pressure chamber 22 has a pressure appreciably below that in the chamber 14 and is provided with agitating means such as rotating dashers whereby the expanded structure is caused to reverse phase, i. e. is instantly broken down with substantially simultaneous separation and formation of butter granules and buttermilk and liberation of the gas. One end of the chamber 22 has a suitable valve outlet 23 to permit escape of the gas which may be recovered and re-used. The fat granules contained in the buttermilk are propelled by the agitator to a suitable working device 24 which may be a conventional churn. As stated above, the fat granules are first gathered in the device 24, whereupon the buttermilk is drained and the gathered mass is washed with water and worked to remove residual buttermilk. The wash water containing residual buttermilk is then drained and the butter properly worked dry with suitable incorporation of salt and additional moisture to give the proper chemical composition of butter. It is important to observe that the expanded mass is broken down preliminary to the working step in the device 24. In this manner only the separated buttermilk containing the butter granules is delivered to the gathering and working device 24 so that its full efficiency is availed of. This would not be true if the highly expanded lacteal fluid were directly delivered to the working device.

In Figure 2 the operation is substantially as described in connection with Figure 1. The pressure chamber is indicated at 14', and the treated lacteal fluid is permitted to flow by gravity through an outlet 25 from which the expanded cream is pumped by the pump 20' to the reduced pressure chamber 26 containing a rotating agitating means in the form of dashers 27 arranged to convey the fluid to an outlet 28. The gas released by this operation passes out through the outlet 29 and may be recovered and reused. The buttermilk containing the fat granules is continuously conveyed through the chamber 26 and is indicated at 30, the level of fluid in the chamber 26 being indicated at 31 in Figure 3. The fluid delivered from the outlet 28, namely, the buttermilk containing the fat granules is continuously delivered to the working instrumentality 32 where the granules are gathered and treated as previously described.

In some cases after treatment in the reduced pressure chamber 22 or 26, instead of conveying the buttermilk containing the fat granules to a working instrumentality, the granules are first strained or otherwise collected from the buttermilk, then properly washed and then conveyed to the gathering and working instrumentality.

It is to be understood that the working instrumentality usually includes means for incorporating additional moisture and salt to give the required butter composition, and gathers the granules and forms the gathered granules into a solid butter suitable for printing and packaging.

Also, as indicated in Fig. 4, the butter containing the granules may be carried from the reduced pressure chamber 26' (i. e. chamber 22 or 26) over a suitable perforated conveyor 33 to the working instrumentality 34. While travelling over the conveyor 33 the buttermilk will drain from the fat granules and the latter may be simultaneously washed and agitated to gather the granules or they may be washed on the conveyor during a part of its travel and through another part of its travel suitably agitated for the purpose of gathering the granules. Thereafter the gathered and washed granules are continuously introduced into the working instrumentality 34. This worker may be a chamber having an auger or screw which will pass the mass through the chamber while working the gathered granules into solid butter and includes means for incorporating additional moisture and salt. From the worker, the butter is continuously extruded, as shown at 35, (or continuously introduced to a suitable extrusion means) whereby to print the same as desired and continuously delivered to a wrapping and packaging machine 36.

It will be observed in accordance with this invention at least the customary churning time of 35 to 50 minutes is eliminated and, as shown in Figure 4, the gathering time likewise may be eliminated or very substantially reduced.

"Working" is intended to mean the usual steps of washing and inclusion of salt and additional moisture necessary to produce a butter of the desired composition, as described herein.

In referring to "fat granules capable of working into butter," I mean the granules substantially instantly formed in the reduced pressure chamber are, upon suitable gathering and working as described herein, readily formed into solid butter without going through a customary and time consuming churning procedure.

I claim:
1. The process of making butter comprising expanding a lacteal fluid containing milk fat such as cream by subjecting it under pressure to intimate contact with an inert gas, thereafter releasing the expanded mass from its initial pressure state with release of the gas and with concomitant further expansion of the initially expanded mass, and agitating said last mentioned expanded mass sufficiently to reverse its phase thereby forming coalescable fat granules capable of working into butter and with further liberation of the gas.

2. The process in accordance with claim 1, wherein the steps of further expansion and agitation of the fluid are substantially simultaneous.

3. The process in accordance with claim 1, wherein the phase of the expanded mass is substantially instantly reversed with concomitant formation of the fat granules.

4. The process in accordance with claim 1, wherein the fat granules are recovered, gathered and worked into butter.

5. The process in accordance with claim 1, wherein the fat granules and buttermilk are recovered and the granules gathered and worked into butter.

6. The process in accordance with claim 1, wherein the process is continuous.

7. The process in accordance with claim 1, wherein the lacteal fluid is pasteurized, and cooled while continuously travelling to a chamber for contact with the gas.

8. The process in accordance with claim 1, wherein the granules are continuously gathered and worked into butter.

9. The process in accordance with claim 1, wherein the granules are gathered and worked into butter and the butter is printed and packaged as continuous steps.

10. The process in accordance with claim 1, wherein the granules are gathered while travelling to a working instrumentality.

11. The process in accordance with claim 1, wherein the granules are drained of buttermilk, washed and gathered while travelling to a working instrumentality.

12. The process in accordance with claim 1, wherein the lacteal fluid is in finely divided form when contacted by the gas.

13. The process in accordance with claim 1, wherein the lacteal fluid is in the form of a fluid body when contacted by the gas.

14. The process in accordance with claim 1, wherein the lacteal fluid is in finely divided form and a liquid body when contacted by the gas.

15. The process in accordance with claim 1 wherein the lacteal fluid is subjected to the inert gas while at a temperature of about 38° to 50° F.

GEORGE W. SHADWICK.

REFERENCES CITED

The following references are of record in the file of this patent:

UNITED STATES PATENTS

| Number | Name | Date |
|---|---|---|
| 1,650,625 | Hapgood | Nov. 29, 1927 |
| 2,081,029 | Young | May 18, 1937 |
| 2,201,872 | Rottenberg | May 21, 1940 |
| 2,302,336 | MacDonald | Nov. 17, 1942 |

FOREIGN PATENTS

| Number | Country | Date |
|---|---|---|
| 24,238 | Great Britain | 1908 |
| 398,666 | Great Britain | Sept. 21, 1933 |
| 25,973 | France | Mar. 13, 1923 |
| 26,174 | France | Apr. 17, 1923 |
| 544,809 | Great Britain | Apr. 29, 1942 |
| 116,533 | Australia | Feb. 18, 1943 |